(No Model.)

A. CONRADT.
COVERED DISH.

No. 258,221. Patented May 23, 1882.

Witnesses.
Edwin F. Dimock
Chas. L. Burdett.

Inventor.
Augustus Conradt
by Theo. G. Ellis. Attorney.

N. PETERS, Photo-Lithographer, Washington, D. C.

UNITED STATES PATENT OFFICE.

AUGUSTUS CONRADT, OF MIDDLETOWN, CONNECTICUT.

COVERED DISH.

SPECIFICATION forming part of Letters Patent No. 258,221, dated May 23, 1882.

Application filed March 27, 1882. (No model.)

*To all whom it may concern:*

Be it known that I, AUGUSTUS CONRADT, of Middletown, in the county of Middlesex and State of Connecticut, have invented certain new and useful Improvements in Covered Dishes; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to butter-dishes, pickle-jars, and other covered dishes in which it is desirable to have a removable cover which shall remain attached to the dish or connected with it in such a manner as to be always handy and ready for use.

The object of my invention is to provide a simpler manner of supporting the cover when removed from over the contents of the dish than has heretofore been in use.

Figure 1:
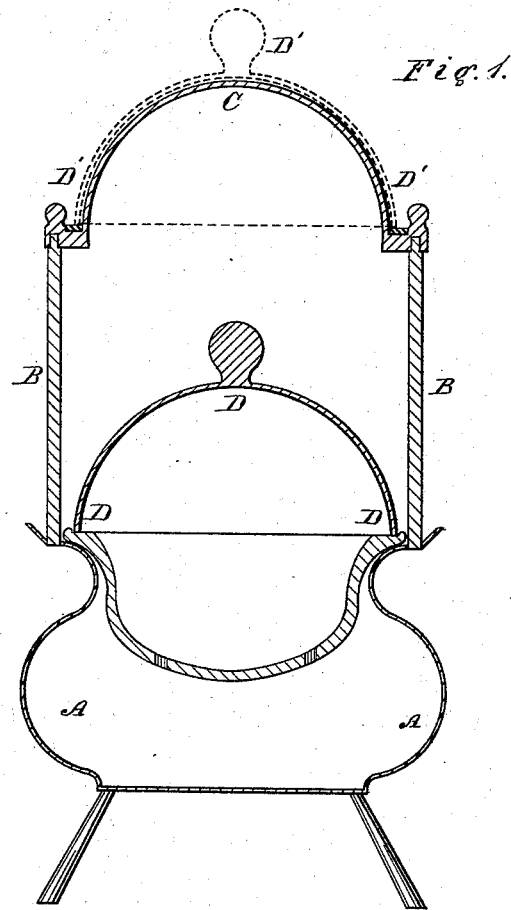
Figure 2:
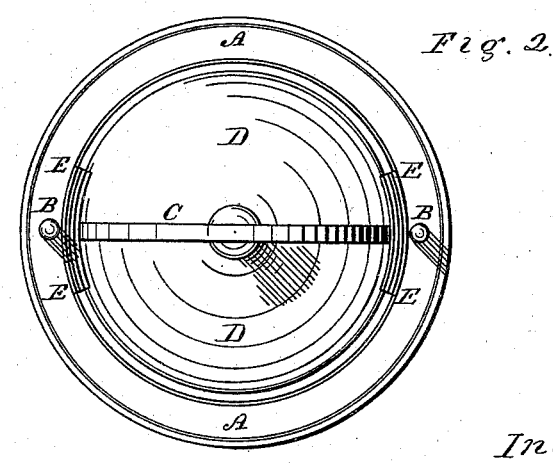

In the accompanying drawings, illustrating my invention, Figure 1 represents a vertical section through a dish, cover, and handle embodying my improvement, showing the cover in full lines in its position on the dish and in dotted lines when removed and placed upon the handle. Fig. 2 is a top view of a butter-dish provided with my improvement.

A represents the body of a butter-dish constructed in the ordinary manner. This dish may be of any form desired, as its form or construction is not a part of my invention.

B B are the posts or upright parts of the handle.

C is the cross-bar of the handle, represented in the drawings as of an arched form.

D is the cover of the dish. It is shown as being of a dome shape, and fits upon the dish in the customary manner.

E E are curved rests, intended to be of the same curve as the edge of the cover, and extending a greater or less distance on each side of the handle to serve as a support to the cover when placed upon the top of the handle, as shown by the dotted lines D' at the top of the handle. When the cover is placed in the position shown at D' it is raised sufficiently high to permit access to the contents of the dish below, while at the same time it remains connected with the dish, is carried with it, and is always ready to be replaced over the dish itself to protect the contents. When it is wished to protect the contents of the dish the cover is placed over it in the position shown by D. When it is wished to remove the cover it is lifted off from the dish by hand, passed out to one side, free from the posts B, and placed so that the handle C will pass into the interior of the cover and the edge of the cover pass down on each side, so as to rest on the curved bars E, as before described.

It is obvious that certain modifications of my invention may be made in the shape of the cover and handle, the essential conditions being that the cover shall have a support in its raised position, and that the handle shall extend upward within it to prevent it from falling off laterally by any tipping of the dish.

What I claim as my invention is—

1. In combination with a dish having a removable cover, a handle adapted to receive and support said cover upon its top and pass upward within it to retain it in place, substantially as described.

2. In a covered dish, the combination of the detachable cover D, the handle-bar C, adapted to project upward within it, and the supports E, attached to the handle, substantially as described.

AUGUSTUS CONRADT.

Witnesses:
EDWD. PAYNE,
HENRY BULLARD.